US005534207A

United States Patent [19]
Burrus

[11] Patent Number: 5,534,207
[45] Date of Patent: Jul. 9, 1996

[54] METHOD AND APPARATUS FOR FORMING AN ARTICLE FROM RECYCLABLE PLASTIC MATERIALS

[75] Inventor: Thomas N. Burrus, Brenham, Tex.

[73] Assignee: Natural Resource Recovery, Inc., Brenham, Tex.

[21] Appl. No.: 271,954

[22] Filed: Jul. 8, 1994

[51] Int. Cl.⁶ .......................... B29C 47/12; B29C 47/36
[52] U.S. Cl. ................ 264/150; 264/177.16; 264/178 R; 264/DIG. 69; 366/79; 366/97; 366/271; 425/209; 425/378.1; 425/461; 425/463; 425/467; 425/812
[58] Field of Search .......................... 264/177.10, 177.16, 264/177.17, 177.19, 211.12, 148–150, 293; 425/378.1, 379.1, 380, 209, 467, 812, 461, 463; 366/79, 97, 271

[56] References Cited

U.S. PATENT DOCUMENTS

| | | |
|---|---|---|
| 93,972 | 8/1869 | Divine . |
| 840,213 | 1/1907 | Holoubek . |
| 2,438,348 | 3/1948 | Morin . |
| 2,874,412 | 2/1959 | Flemming et al. ...................... 264/311 |
| 2,917,776 | 12/1959 | Dorman et al. ........................... 264/37 |
| 3,402,682 | 9/1968 | Peden et al. ............................. 425/380 |
| 3,477,101 | 11/1969 | Fritsch . |
| 3,825,641 | 7/1974 | Barnett .................................. 264/209.8 |
| 3,897,184 | 7/1975 | Woodburn et al. ....................... 425/79 |
| 3,956,981 | 5/1976 | Pitt ......................................... 425/202 |
| 4,003,408 | 1/1977 | Turner ..................................... 138/118 |
| 4,028,288 | 6/1977 | Turner ..................................... 260/2.3 |
| 4,067,826 | 1/1978 | Emery ...................................... 264/37 |
| 4,138,534 | 2/1979 | Tedesco ................................. 264/45.5 |
| 4,191,522 | 3/1980 | Turner ..................................... 425/552 |
| 4,395,210 | 7/1983 | Hama .................................. 264/178 R |
| 4,655,987 | 4/1987 | Zertuche ................................. 425/467 |
| 4,968,463 | 11/1990 | Levasseur ................................. 264/37 |
| 5,217,655 | 6/1993 | Schmidt ............................... 264/177.2 |
| 5,217,800 | 6/1993 | Pentecost ............................ 264/177.2 |
| 5,312,573 | 5/1994 | Rosenbaum et al. ..................... 264/37 |

FOREIGN PATENT DOCUMENTS

| | | | |
|---|---|---|---|
| 2442714 | 8/1980 | France .............................. 425/380 |
| 2512391 | 3/1983 | France .............................. 425/467 |
| 2647613 | 12/1978 | Germany ............................ 425/205 |

*Primary Examiner*—Jeffery R. Thurlow
*Attorney, Agent, or Firm*—John R. Kirk, Jr.; Jenkens & Gilchrist

[57] ABSTRACT

A method for forming an article from recyclable plastic materials includes progressively heating thermoplastic solid particles simultaneously with mixing, melting and conveying the particles, prior to delivery of molten material to an extruder. The process is particularly suitable for the continuous extrusion of elongated members having a plurality of internal wall surfaces defining elongated cavities within the member. The apparatus embodying the present invention includes a heated mixer-conveyor that simultaneously heats, melts, mixes and conveys thermoplastic material from an inlet port at which the material is received in solid particulate form, to a discharge port at which the material is in a substantially liquid state. A die particularly adapted for the continuous extrusion of an elongated member having internal walls shaped by surfaces within the die cavity is also disclosed.

23 Claims, 6 Drawing Sheets

METHOD AND APPARATUS FOR FORMING AN ARTICLE FROM RECYCLABLE PLASTIC MATERIALS

TECHNICAL FIELD

This invention relates generally to a method and apparatus for forming useful articles from recyclable plastic materials, and more particularly to such a method and apparatus is which the method is carried out in a continuous process.

BACKGROUND ART

The recycling of thermoplastic materials is desirable for both economic and environmental reasons. Heretofore, extruded articles have been formed of recycled plastic material generally by one of two processes. In the first process, measured amounts of solid thermoplastic material are reduced and mixed in a Bandbury or other batch-type mixer. The mixture may also be heated while in the mixer, either to a temperature near or at the melting temperature of the thermoplastic material, and then transferred to an extruder. The premeasured batch of material is then forced through a die by the extruder. This process is inherently a batch process wherein a predetermined amount of thermoplastic material, usually from about 14 kg to 30 kg (250 to 450 lbs), is processed at a time. The batch mixes are difficult to transfer to, and match the output requirements of the forming equipment, i.e., the extruder. Also, batch mixers of this type are expensive to purchase and service.

In the second process, reclaimed thermoplastic particles, in solid form, are fed directly into an extruder and the solid particles melted, pressurized, and extruded through a die. However, this process is inherently slow because the thermoplastic material must be held in the extruder for a length of time sufficient for the material to heated to its melting point. Thus, throughput, or the output production rate of the fluid plastic material, is quite limited, causing the cost of end products made by this process very expensive. Also, some materials such as polyvinyl chloride, when heated in an extruder, may cause physical damage to the machine as a result of chemical reaction. Moreover, because extruders are built to very close tolerances and have small internal clearances between the screw conveyor and inner case, contaminates in scrap plastic material can severely damage the extruder. The increased downtown, repair and service requirements further exacerbate the economic disadvantages of using an extruder for the direct conversion of recyclable scrap thermoplastic materials to extruded shapes.

The present invention is directed to overcoming the problems set forth above. It is desirable to have a process whereby recyclable scrap thermoplastic material can be simultaneously mixed, heated, melted, prior to delivering as a continuous molten stream of material to an extruder. Furthermore, it is desirable that the rate of delivery of the molten stream to the extruder be selectively variable to match the processing requirements of the extruder. It is also desirable to have an apparatus wherein the recyclable thermoplastic material can be progressively heated simultaneously with mixing and conveying the material from a position at which it is received as solid particles to an output position at which it is an essentially homogeneous flowable mass.

DISCLOSURE OF THE INVENTION

In accordance with one aspect of the present invention, a process for forming an article from recyclable plastic material includes dividing the material into a plurality of separate solid particles and then progressively heating the particles concurrently with mixing and forming a substantially homogeneous molten mixture. During the steps of heating and mixing, the thermoplastic is continuously conveyed from a position at which the solid particles are received in a substantially continuous flow to a position at which the molten material is discharged in a substantially continuous stream. The molten material is then shaped, cooled, and formed into a solidified article In another aspect of the present invention, a method for forming an article having an open cell structure in which a network of interconnecting walls define a plurality of openings through the article includes delivering a flow of molten plastic material to an extruder, pressurizing the molten material and then forcing the material through an extrusion die. The die is shaped to form an elongated continuous member having a cross section consisting of internally disposed interconnected wall surfaces that define elongated cavities within the continuous member, and is positioned so that the elongated continuous member is discharged from the die in a vertically downward direction. The formed elongated continuous member is then immersed in water and then cut into a plurality of transverse sections.

In yet another aspect of the present invention, an apparatus for simultaneously heating, mixing, melting and conveying recyclable thermoplastic materials includes an elongated shell having a cylindrical interior wall surface that is concentrically positioned with respect to a longitudinal axis extending between ends of the shell, and a rotor rotatably mounted in the shell in coaxial alignment with the longitudinal axis. The rotor has a plurality of elongated members extending radially outwardly toward the interior wall of the shell and are arranged in radially and axially spaced relationship in a spiral pattern around and along the longitudinal axis. The apparatus also includes inlet and outlet ports through the shell, a means for heating the interior wall surface of the shell, and a means for rotating the rotor.

In still another aspect of the present invention, a die for continuously forming a member having a cross section consisting essentially of a plurality of internal walls that define internal cavities within the member has a top wall and a plurality of side walls that form and open-ended cavity. A plurality of internal surface forming members are disposed within the cavity and are attached, in spaced relationship to each other, to the top wall of the die. Each of the internal surface forming members has a material shaping surface disposed adjacent the open end of the cavity.

BEST MODE FOR CARRYING OUT THE INVENTION

Figure 1:
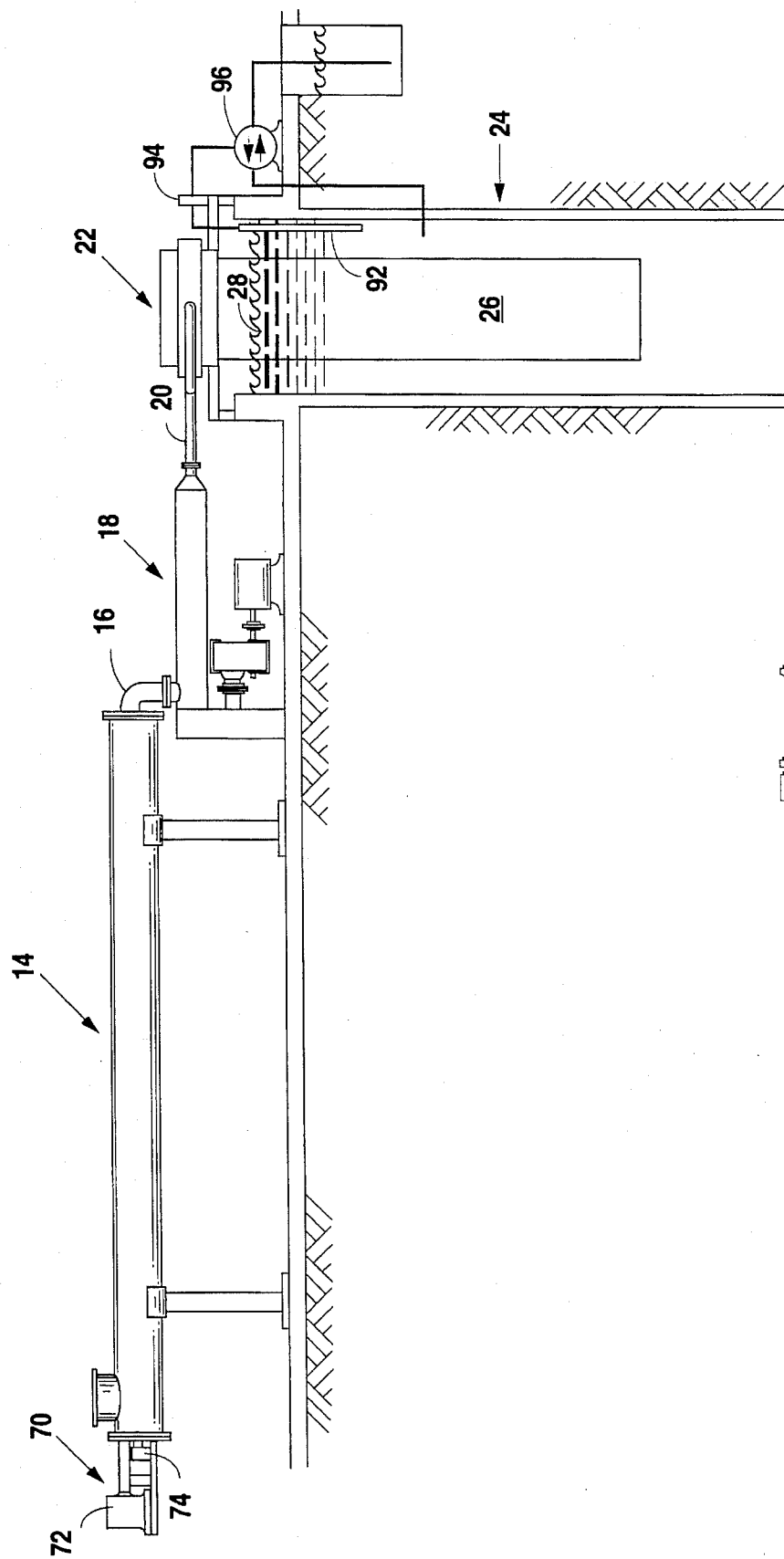
FIG. 1 is a schematic representation, in elevational and partially sectional view, of an apparatus for use in forming articles from recyclable plastic materials in accordance with the present invention.

An apparatus for forming an article from recyclable plastic material by the method embodying the present invention is shown in somewhat schematic fashion in FIG. 1, and includes a heated mixer-conveyor 14, to be described later in greater detail, that is connected by way of a manifold 16 to a conventional extruder 18. The extruder 18 is connected through a manifold 20 to an extrusion die 22, which in the preferred embodiment of the present invention is disposed over a water pit 24 so that a continuously formed elongate member extruded through the die 22 is cooled by immersion in a body of water 28 maintained at a selectively variable level within the water pit 24.

Importantly, the heated mixer-conveyor 14 simultaneously heats, mixes, melts, and conveys recyclable plastic material in a continuous flow to the extruder 18. As shown in more detail in FIGS. 2–4, the heated mixer-conveyor 14 has an elongated shell 30 having a first end 32 at which an inlet port 34 forms an opening through the shell 30, and a second end 36 at which a discharge port 38 is provided. Preferably, the elongated shell 30 is a cylindrical member having a longitudinal axis 40, axially extending between the first and second ends 32,36, and an interior wall surface 42 concentrically disposed in radially spaced relationship about the longitudinal axis 40.

The heated mixer-conveyor 14 also has rotor 44 that is rotatably mounted within the shell 30 in coaxial alignment with the longitudinal axis 40 and has a length that extends substantially completely between the first and second ends 32,36 of the shell 30. The rotor 44 is preferably a hollow drum-shaped member having an exterior, or outer, wall surface 46 extending along the length of the rotor 44 that cooperates with the interior wall surface 42 of the shell 30 to define an annular cavity between the shell 30 and the rotor 44.

Figure 3:
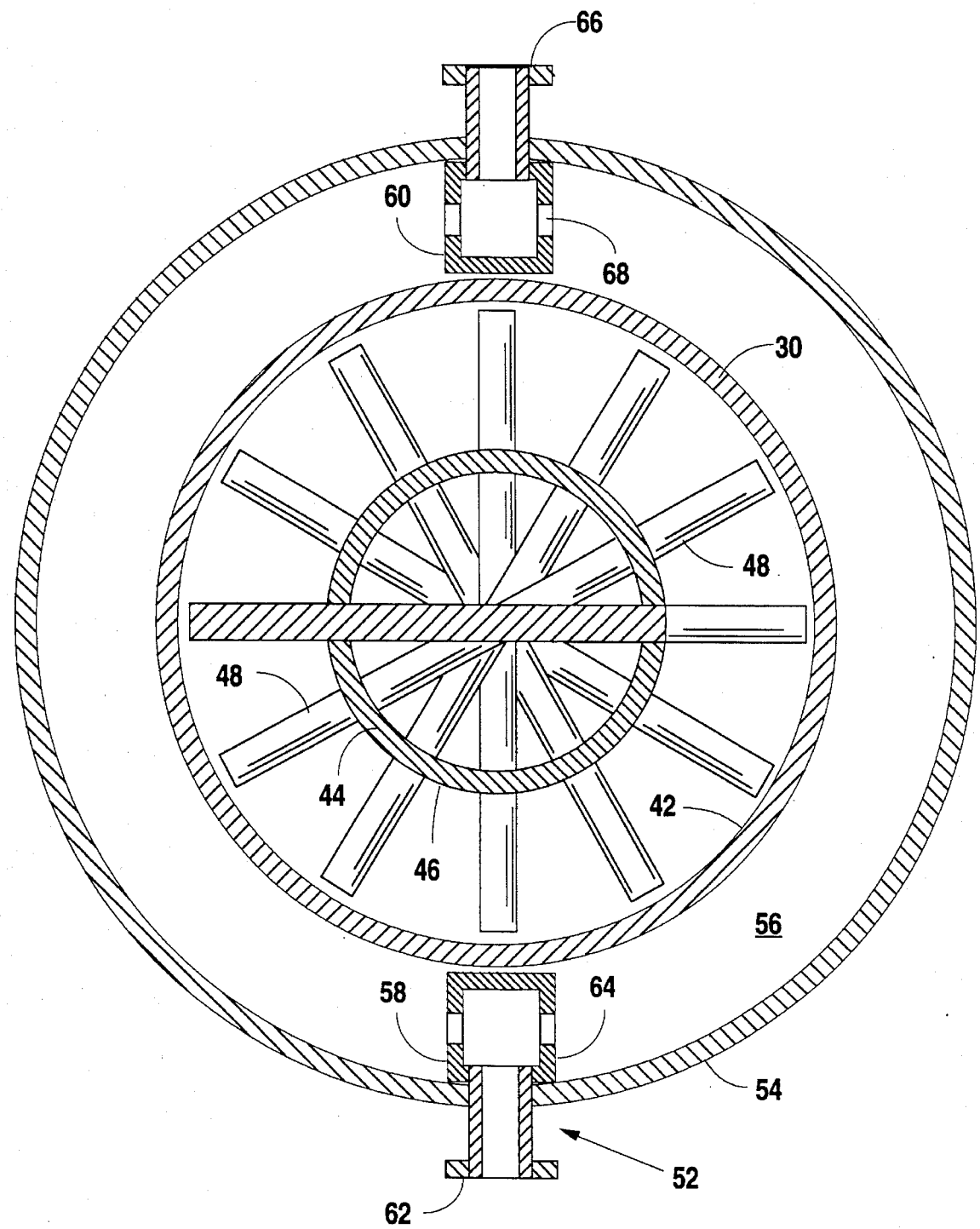
FIG. 3 is a cross-sectional view of the apparatus embodying the present invention, taken along the lines 3—3 in FIG. 2.

The rotor 44 also has a plurality of elongated members 48 that extend radially outwardly from the outer wall surface 46 of the rotor 44 and terminate at a position adjacent the inner wall surface 42 of the shell 30. Preferably, the elongated members 48 are round pegs that, as best shown in FIG. 3, also extend through, and are welded to, both walls of the hollow rotor 44. This arrangement distributes the bending, or shear, forces imposed on a peg across the transverse distance between the rotor walls and reduces the possibility of the peg 48 breaking away from the rotor 44 at a single welded connection point. Alternatively, the elongated members 48 could have a square, rectangular, or flat bladed shape, although in carrying out the preferred embodiment of the present invention, a member having a circular cross section, i.e., round pegs, is desired. Also, the elongated members 48 could extend completely beyond both wall of the rotor 44 so that both ends of the member 48 are positioned adjacent the inner wall surface 42.

Importantly, the elongated members 48 are spaced in a spiral pattern on the rotor 44, both around and along the longitudinal axis 40 so that as the rotor 44 turns, material contained within the annular cavity is squeezed between the pegs 48, thereby imposing significant shear forces on the material. The shear forces cause an intensive mixing of the material within the annular cavity. If each end of the elongated members 48 extend beyond the outer rotor surface 46, they would, in effect, form a double spiral, or helix, around the rotor 44.

In an illustrative example of the preferred embodiment of the present invention, the heated mixer-conveyor 14 has a length of about 6.1 m (20 feet). A section of conventional screw conveyor, continuous surface flighting 50 is attached to the rotor 44 adjacent the first end 32 of the shell 30, and extends along the rotor 44 for about 10% of the rotor length, i.e., about 61 cm (2 feet). Optionally, the continuous surface flighting 50 may extend along from about 10% to about 33% of the length of the rotor 44. The exterior wall surface 46 of the rotor 44 has a diameter of 16.8 cm (6⅝ inches) and the interior wall surface 42 of the shell 30 has a diameter of 31.1 cm (12¼ inches), with the pegs 48 extending outwardly to within about 0.6 cm (¼ inch) of the interior wall surface 42. The pegs 48 each have a diameter of about 1.9 cm (¾ inch) and are radially spaced at 30° intervals around the longitudinal axis 40 and at 2.54 cm (1 inch) intervals along the axis. Desirably, the ratio of the peg diameter to the diameter of the interior wall surface is about 1 to 16. Pegs having a ratio significantly greater than this ratio will increase the rate at which material is axially conveyed from the inlet port 34 to the discharge port 38, thus reducing the time the material is in the mixer and, accordingly, providing insufficient time for the material to melt. Pegs having a diameter significantly less than the 1 to 16 ratio may bend or break.

The pegs 48 thus impose an interrupted, or noncontinuous, intensive mixing and axial conveying action on material contained within the annular cavity between the rotor surface 46 and shell surface 42, along about 90% i.e., 5.5 m (18 feet) of the rotor length. The above described radial and axial spacing will produce about 18 "wraps" of pegs 48 around surface 46 of the rotor 44 and will advance the plastic material contained within the annular cavity between the rotor 44 and the shell 30 about 30.5 cm (1 foot) toward the second end 36 of the shell 30 with each complete 360° revolution of the rotor 44. Thus, if the rotor 44 is rotated at a speed of 1 rpm, it will take about 20 minutes for material deposited into the inlet port 34 to be heated, mixed, melted, and conveyed, or delivered, to the discharge port 38. All of these steps are carded out in within the heated mixer-conveyor 10 at substantially atmospheric pressure, i.e., no pressure or other assistance is required to move the material contained within the annular chamber toward the discharge port 38.

Figure 4:
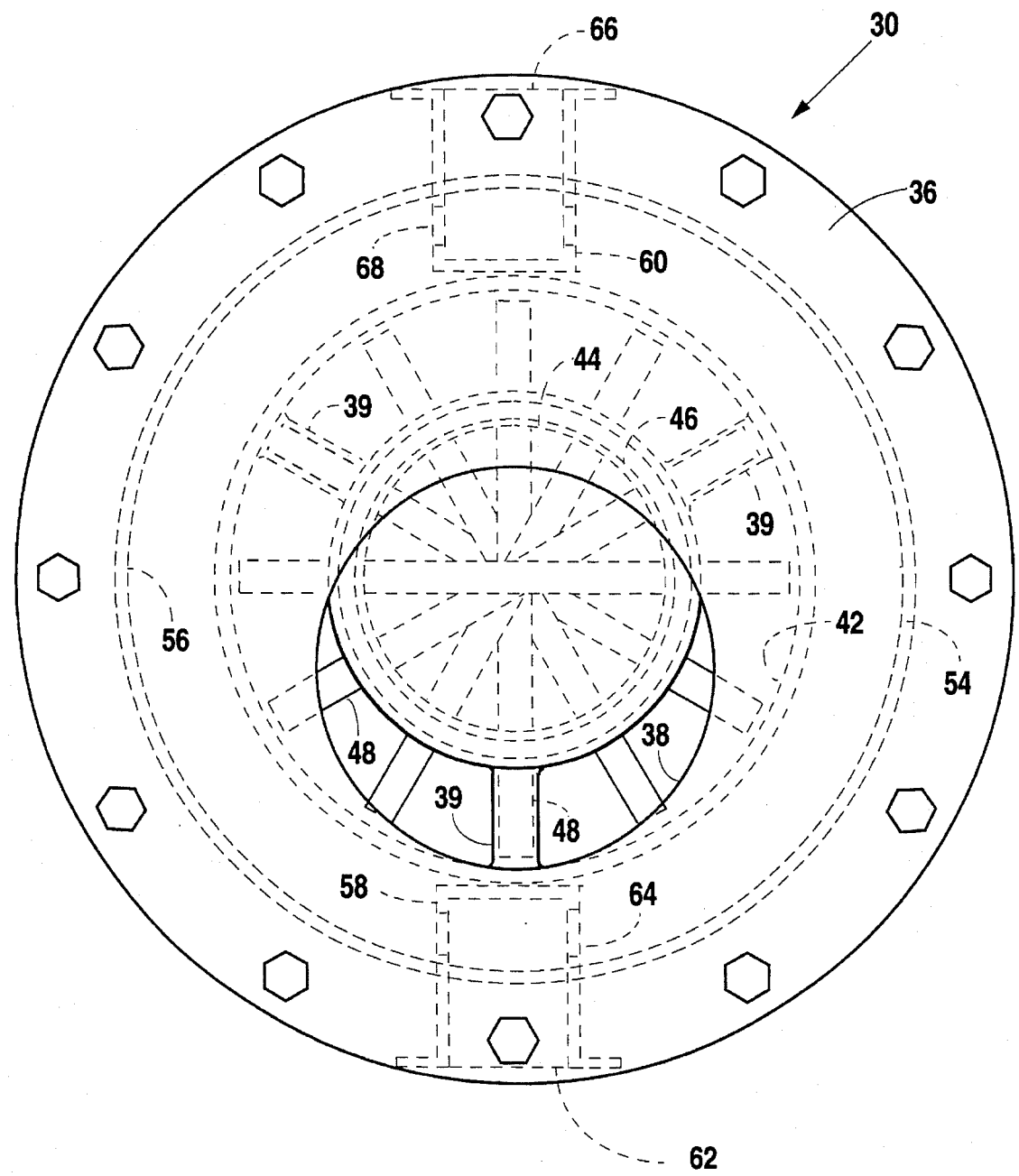
FIG. 4 is an end view of the apparatus embodying the present invention.

As best shown in FIG. 4, the discharge port 38 is essentially an open end of the annular cavity between the interior wall surface 42 of the shell 30 and the exterior surface of the rotor 46 of the rotor 44. The annular opening is obstructed only by a bearing mount 39 which extends inwardly from the shell 30 to rotatably support the rotor 44 at the second end of the shell 30. Alternatively, the discharge port could extend through the bottom of the shell 30 at the second end 36, in the same manner as the inlet port 34 extends through the top of the shell 30 at the first end 32. This arrangement would eject the molten material in a vertically downward direction from the annular cavity surrounding the rotor 44.

It can be seen that the size, shape and spacing of the elongated members 48 can be varied, as well as the rotational speed of the rotor, and all of these variables will affect the residence, or dwell, time of the material within the shell. Furthermore, the size of the annular cavity within the shell 30 will affect the amount of material contained therein and thus the amount of heat transfer required to melt the material. In the above example, the annular cavity has a cross-sectional area, without allowing for the presence of the flighting 50 or the pegs 48, of about 537 cm$^2$ (83.3 in$^2$). In the above described sized mixer-conveyor 14 embodying the preferred embodiment of the present invention, recyclable thermoplastic polyethylene can be heated to its melting point (e.g., typically about 177° C. (350° F.) in about 20 minutes.

Figure 2:
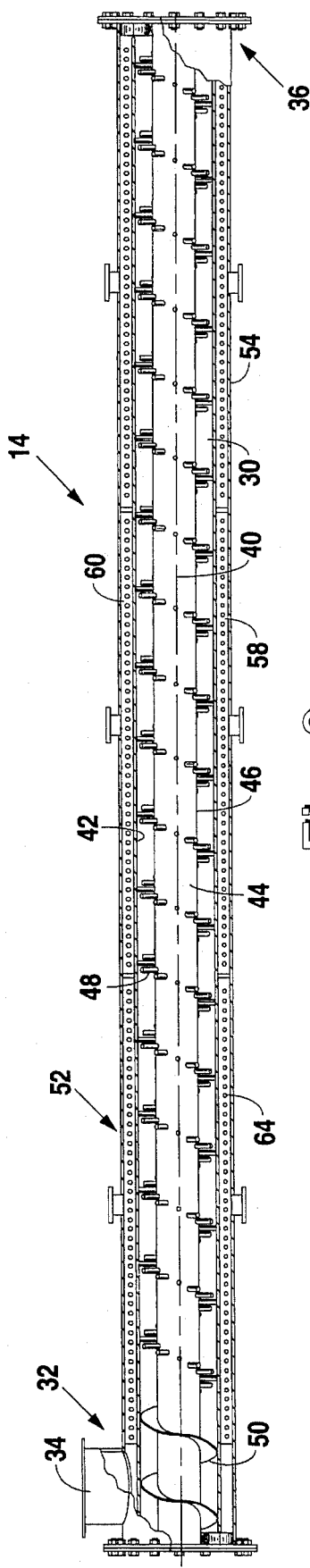
FIG. 2 is an elevational view, with portions of an outer jacket broken away to show interior details, of an apparatus embodying the present invention for simultaneously heating, mixing, melting and conveying recyclable thermoplastic materials.
Figure 2A:
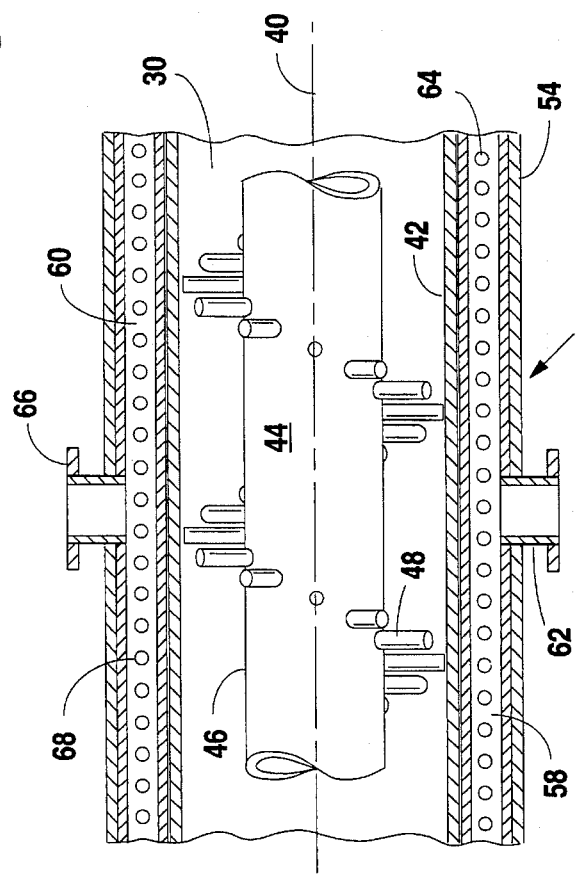
FIG. 2A is an enlarged view of a portion of FIG. 2 showing interior features of the apparatus embodying the present invention in greater detail.

The heated mixer-conveyor 14 embodying the present invention also has a means 52 for heating the interior wall surface 42 of the shell 30 so that material contained within the annular cavity can be heated. As best shown in FIGS. 2, 2A and 3, the means 52 includes a jacket member 54 surrounding the shell 30 and, in cooperation with end plates at each end of the mixer-conveyor 14, form a closed annular cavity 56 between the shell 32 and the jacket 54. A plurality of fluid supply manifolds 58 and fluid drain manifolds 60 are advantageously disposed respectively at the bottom and top of the annular cavity 56, This arrangement provides uniform distribution of the heated fluid and prevents the entrapment of air, gases, or cavitation bubbles in the annular cavity 56, assuring that the cavity will be continuously and uniformly charged with hot liquid.

Desirably, the each of the manifolds 58,60 are constructed in axially paired, and radially opposed, sections so that the fluid temperature and flow rates can be selectively controlled in separate axially spaced areas along the shell 30. In the preferred embodiment of the present invention, the supply manifold 58 is formed of three separate sections in which each section has a corresponding inlet port 62 separately connecting each section with a source of fluid, and a plurality of holes 64 extending through both sides of each section of the supply manifold 58. To assure even distribution of fluid, the total cross-sectional area of all of holes 64 in each section should not exceed the cross-sectional area of the manifold section. Similarly, the drain manifold 60 is formed of three separate sections with each section separately connected to a drain port 64. Each section of the drain manifold 60 has a plurality of holes 68 extending through both sides of each section, with the total number and cross-sectional area of the holes 68 in the drain manifold 60 being substantially equal to that of the holes 64 provided in the supply manifold 58. The drain ports 66 are preferably connected to conduits, not shown, that return the fluid to a reservoir, or sump, from which the fluid is pumped, heated, and recirculated to the fluid inlet ports 62.

It is desirable that the fluid provided to each of the inlet ports 62 be separately controllable with respect to flow rate and temperature, to satisfy the particular heat transfer requirements of material contained in a corresponding section of the shell 30. For example, solid material deposited into the inlet port 34 of heated mixer-conveyor 14 may be at room temperature. It is desirable to quickly raise the temperature of this material to, or at least near to, the melting point of the temperature. On the other hand, if the surface temperature of the interior wall surface 42 is too high, scorching or outgassing of the solid material may occur. Therefore, it is desirable to deliver a relatively high flow of fluid, maintained at a temperature at or near the melt temperature, through the annular cavity 56 surrounding the shell 30. At the section adjacent the discharge port 38, less heat transfer is required, but it is still imperative to maintain the substantially molten mass of material contained in shell 30, at the melt temperature. This requires less fluid flow through the annular cavity 56 than at the inlet port end of the shell 30. Preferably the fluid is oil which is maintained at a preselected temperatures, and delivered at preselected rates, by conventional heaters and pumps, not shown.

Alternatively, the means 52 for heating the interior wall surface of the shell 30 could be a steam or electrically heated arrangement.

The heated mixer-conveyor 14 embodying the present invention also has a means 70 for rotating the rotor 44. Desirably, the rotation means 70 includes a conventional electric motor 72 that is connected through a reduction gear 74 to the rotor 44. Alternatively, the means 70 may include a hydraulic or air motor driven by a fluid that is pressure and flow controlled to produce a selected output speed. In the preferred embodiment of the present invention, a 1.5 kW (2 HP) electric motor, having a maximum output speed (with a 60 Hz power supply) of 1740 rpm, is joined to a double reducer, the first providing a reduction of 31 to 1, and the second having a reduction of 25 to 1. Thus, at the rated motor speed, the final output to the rotor 44 is about 2.25 rpm. A conventional frequency modulating motor controller is used to selectively vary the actual output to the rotor from about 0 to about 4 rpm.

In carrying out the method, embodying the present invention, for forming articles from recyclable plastic materials, the manifold 16 joining the above described heated mixer-conveyor 14 with the extruder 18 is preferably insulated or heated by a jacket surrounding the manifold to prevent heat loss. Likewise, the manifold 20 joining the extruder 18 with the die 22 is also preferably insulated or heated. Also, with respect to the following description of the extrusion die 22, it should be noted that in the interest of avoiding undue duplication and complexity, material is injected through inlets located on four sides of the die 22 by a only a single extruder and common manifold. With such multiple inlet die arrangements, it is common practice, to supply molten material from multiple extruders. In carrying out the method for forming an article having a multiple open cell structure, as described below, it is preferable to have at least two extruders, with each extruder feeding no more than two inlets of the four-inlet cavity of the die 22.

Figure 5:
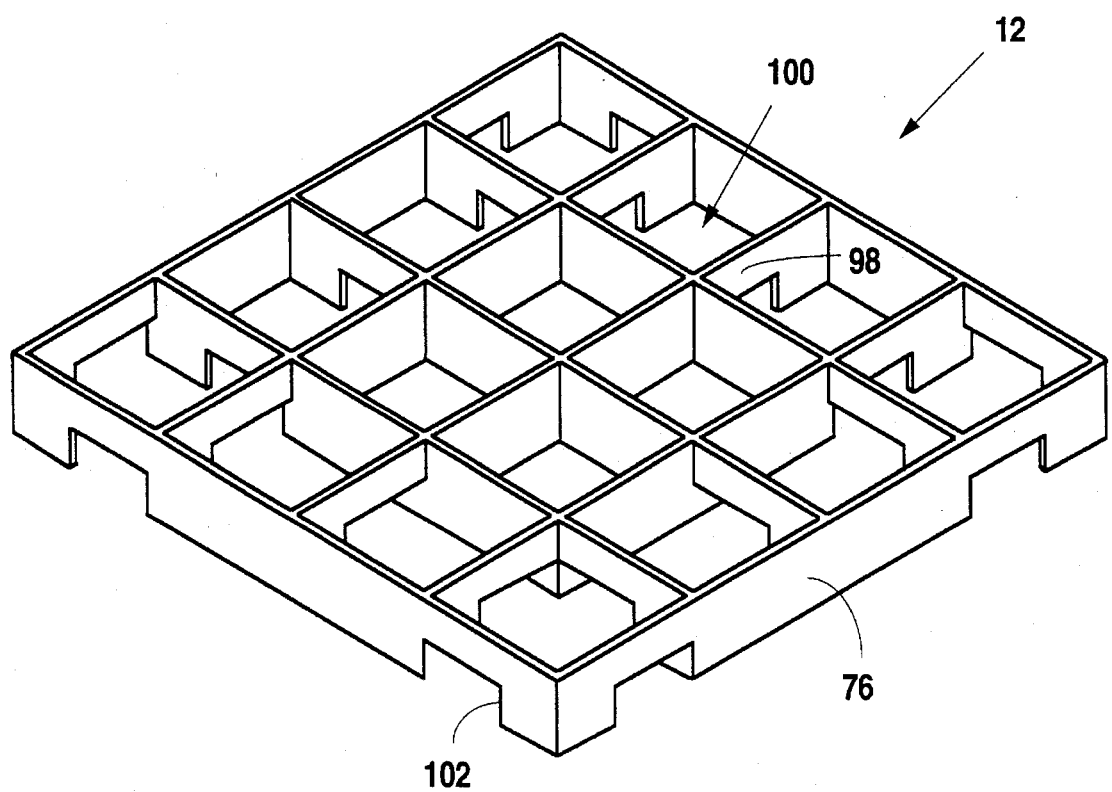
FIG. 5 is a perspective view of a shipping pallet produced by the method for forming an article having a multiple open cell structure embodying the present invention.
Figure 6:
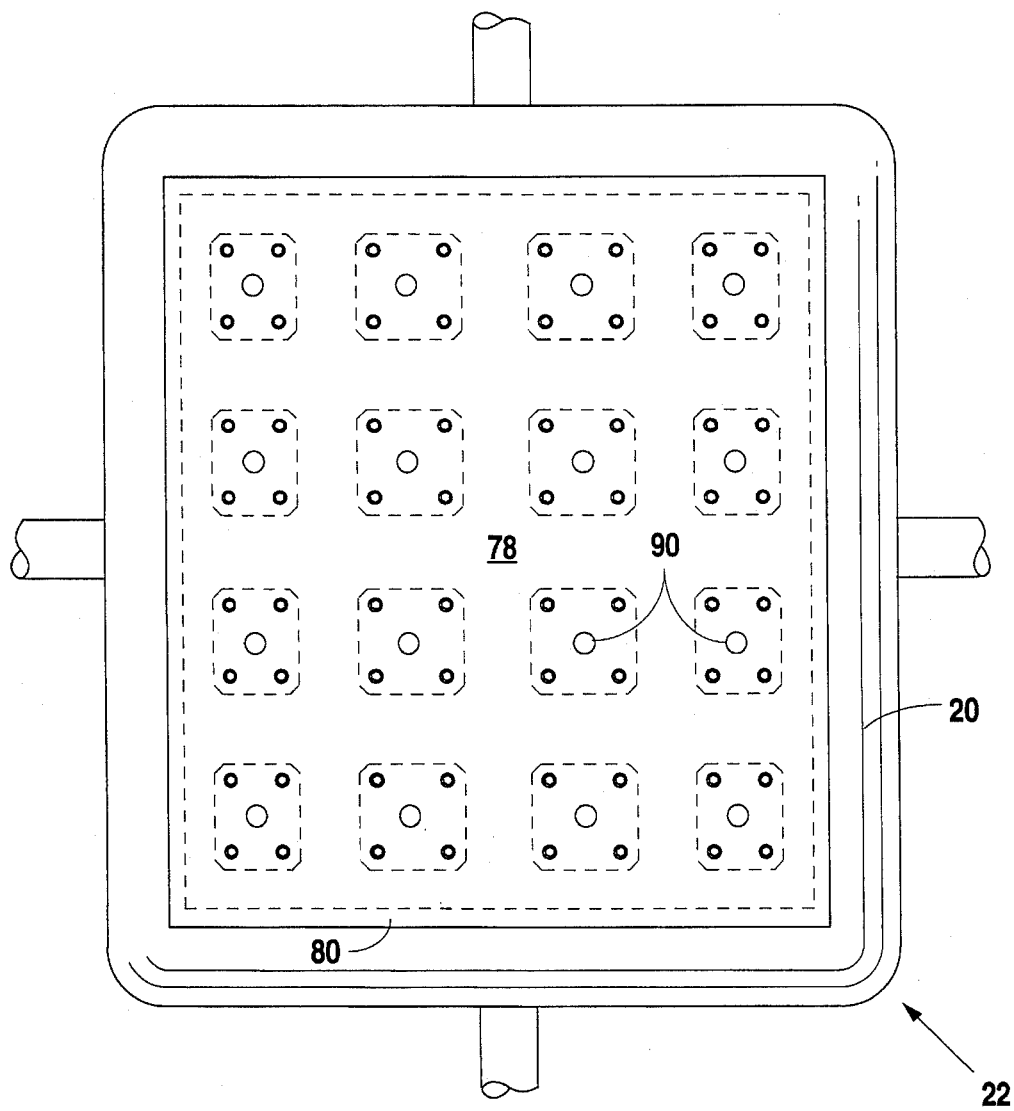
FIG. 6 is a side view of a die useful for forming multiple open cell structures according to the method embodying the present invention; and, FIG. 7 is a sectional view, showing internal forming members in elevation, of the die shown in FIG. 6 that is useful for forming multiple open cell structures according to the method embodying the present invention.
Figure 7:
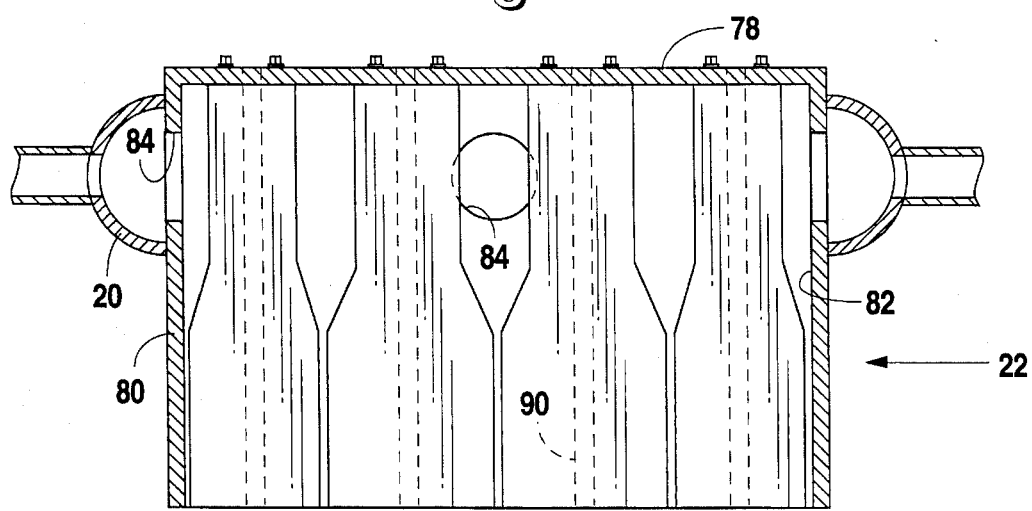

In FIGS. 6 and 7, an extrusion die 22 is shown that is specifically adapted for forming the elongated continuous member 26 by the process embodying the present invention. In the preferred embodiment, the elongated continuous member 26 is subsequently cut, or sliced, into a number of transverse section, each of which are multiple cell open structures, such as a shipping pallet 12, which is shown in FIG. 5. The die 22 has a top wall 78 and four side walls 80 which define a partially enclosed cavity 82 having a generally open bottom face. Each of the side walls 80 have an opening 84 centrally formed therethrough providing fluid communication between the pressurized fluid material supply manifold 20 and the die cavity 82. A plurality of internal surface forming members 86 are disposed within the die cavity 82, in spaced relationship with each other. Each of the internal surface forming members 86 have a generally rectangular cross section and are individually attached to the top wall 78 of the die member. Upon injection of a molten, fluid, material into the cavity 82, by way of the openings 84, the material will flow around each of the internal surface forming members 86 and fill the spaces between adjacently disposed forming members 86, and between the side wall 80 and the forming members 86 disposed adjacent the side wall

80. As additional material is forced into the cavity 82, material will be forced, or extruded, out through the open bottom of the die 22 as a continuous, elongated member 26 having its exterior surfaces shaped by the side walls 80, and its interior surfaces shaped by the internal surface forming members 86.

Thus, the above described die arrangement will form a continuous elongated member 26 having a cross section consisting of internally disposed interconnected wall surfaces that define elongated cavities within the elongated member. As can be seen, the interconnected wall surfaces are formed by the spaces, at the bottom face of the die 22, between adjacently disposed internal surface forming members 86. The elongated cavities within the elongated member are determined by the area covered, or blocked, at the bottom face of the die 22, by the presence of the forming members 86. The internal surface forming members 86 may have a cross section other than the rectangular shape shown in FIGS. 6 and 7. For example, the individual forming members 86 may have a circular, curvilinear, rhomboid, polygonal or other cross-sectional shape for forming an article to be used for decorative or architectural purposes.

The extrusion die 22, as just described, is particularly adapted for the formation of elongated members 26 that can be cut into transverse sections and used for a shipping pallet 12, as shown in FIG. 5. As the elongated member 26 is being continuously formed by the die 22, it is discharged in a substantially vertically downward direction and immersed in water 28 that is contained within a water pit 24 positioned immediately below the bottom face of the die 22. The water 28 cools the material so that it becomes solidified. Advantageously, the water fills the internal cavities within the elongated member 26 thereby simultaneously solidifying the internal wall structure of the member 26. It is desirable that the space within each of the elongated cavities between the bottom face of the die 22 and the surface of the water 28 be vented to avoid a pressure differential between interior cavities and the exterior of the elongated member 48. In the preferred embodiment of the present invention, an air vent 90 formed through each of the internal surface forming members 86 extends between the bottom face and the top wall 78 of the die 22. Alternatively, an air vent for each of the elongated cavity spaces between the die and the water surface could be provided by a vent line, open to the atmosphere, that extends upwardly from the bottom of the water pit 24 to a position just below each of the internal surface forming members 86 in the die 22.

The water pit 24 may advantageously be 9 m (30 feet) or more in depth. It is desirable to have a water level control so that the water 28 in the pit 24 can be maintained at a desirable level during the extrusion forming and water immersion of the elongated member 26. This will generally require that water 28 be withdrawn from the pit 24 as the elongated member 26 is immersed, or submerged, and displaces water. Flow level control devices of this type are well known and generally include a float gauge 92 that delivers a signal to a flow controller 94. The flow controller 94 controls a pump 96 in fluid communication with the water 28 in the pit 24 and an external reservoir 98. Preferably, the pump 96 is both reversible, so that water 28 can be selectively pumped into or out of the water pit 24, and variable displacement to provide the addition or removal of water 28 to or from the pit 24 at a controlled rate. It is also desirable to maintain the temperature of the water 28 in the pit 24 within a predetermined range to provide uniformity in cooling the elongated member 26. If needed, temperature control may be provided by continuously circulating the pit water 28 through a cooling tower or similar device.

Desirably, the continuously formed elongated member 26 is formed of a material having a neutral buoyancy, i.e., it's specific gravity is about 1.0, so that there are no flotation forces generated by the solidified portion of the member as it is submerged. If the buoyancy of the material is negative, it is desirable to control the water level in the pit 24 so that the elongated member 26 does not float, or rise, and distort the unsolidified portion of the member as it is discharged from the die 22. For example, it may be desirable to initially have the top surface of the water 28 at a distance of about 5 cm to 15 cm (2 to 6 inches) below the bottom face of the die 22, and then progressively lower the water level to a distance of about 61 cm to 76 cm (24 to 30 inches) from the bottom face of the die 22 as the first-formed end of elongated member approaches the bottom of the pit 24.

Although not essential to carrying out the method for the continuous forming of elongated articles according to the present invention, it is convenient, for production purposes, to have two water pits 24 positioned side by side, and the extrusion die 22, or better, the extruder 18 and the die 22, pivotable between the two pits. This arrangement allows the substantially uninterrupted extrusion of elongated members by simply switching the die 22 between pits. For example, when a first formed elongated member 26 reaches it's desired length, the member can be cut, or severed, from the continuous extruded structure, the die 22 pivoted to the second pit, and immersion of a second formed elongated member 26 initiated in the second pit while the first formed member is removed from the first pit.

The method for forming an article from recyclable plastic material according to the present invention will be described in conjunction with the apparatus as discussed above and shown in the drawings. Initially, a recyclable thermoplastic material is preferably cut, ground, or otherwise reduced, to a plurality of solid plastic particles having a nominal particle size of about 0.6 cm (¼ inch). The source for such materials desirable includes polyethylene milk, motor oil, household detergent and cleaner bottles, and similar containers that are essentially non-biodegradable and present environmental problems with respect to landfill disposal. Other suitable materials include thermoplastic materials in general, and, more particularly, polyethylene, polyurethane, and polyvinyl chloride materials, or mixtures of these materials. If a mixture, it is desirable, to prevent vapor formation of the lower melting components in the mixture, that all of the thermoplastic materials incorporated into a specific processing mixture have a melting temperature that is within a range of about 56° C. (100° F.), and preferably within 28° C. (50° F.), of each other. Advantageously, other materials such as rubber, sawdust, paper, thermoset plastic, metal chips or turnings, and organic and inorganic fibers can be added in amounts of up to about 30% of the mixture. In this amount, the thermoplastic material provides a matrix surrounding, or encapsulating the added material. Such added materials are identified herein, and in the claims, by the term "reinforcing materials" regardless of whether or not the added material alters the strength or other physical properties of the subsequently formed composite thermoplastic article.

The solid particles, desireably comprising at least 70% thermoplastic material, is fed into the heated mixer-conveyor 14 by way of the inlet port 34 adjacent the first end 32 of the shell 30. The interior of the shell 30 is heated, in the previously described manner, to melt the solid mixture prior to discharge from the discharge port 38 adjacent the second end 36 of the shell 30.

The heating, mixing and conveying of the thermoplastic material is carded out within the mixer-conveyor 14 in the following manner. Initially, the solid particles are conveyed by the screw conveyor flighting 50 adjacent the inlet port 34. As the material is conveyed toward the second end 36, it is heated by way of heat transfer through the interior wall surface 42 of the shell 30. The interior wall surface 32 if desirably maintained at, or near, the melting temperature of the material having the highest melting temperature. For example, if the material being processed is a mixture in which some of the thermoplastic material has a melting temperature of 155° C. (310° F.) and other (350° F.), the interior wall surface should be maintained at the higher temperature, i.e., 177° C. (350° F.).

The material within the shell 30 is conveyed by rotation of the rotor 44. After the material advances from the solid flighting section 50 to the interrupted surface conveyance section, i.e., the pegs 48, the pegs, through the imposition of significant shear forces on the mixture, intensively mixes the material concurrently with rotation of rotor 44. Also, simultaneously with mixing and conveying, the material is heated by way of heat transferred to the mixture through the interior wall 42 of the shell 30. As described above, the rotor is rotated at a rate sufficient to thoroughly heat the mixture to its melting temperature by the time it is conveyed to the discharge port 38. For the exemplary mixer-conveyor 14 described above, the rotor 44 is rotated at a rate of about 1 rpm, and the mixture residence time within the shell 30 is about 20 minutes.

Significantly, the heating, mixing, and conveying are all carried out at, or near, atmospheric pressure. The mixture is discharged through the discharge port 38 with only sufficient force to deliver it through the manifold, or conduit, 16 to the extruder 18. In the extruder 18, the molten mixture is compressed and forced from the extruder, through the manifold 20, and into the die cavity 82 of the die 22. Continued pressure, a result of material compression by the extruder 18, forces the molten material from the bottom of the die cavity 82. The internal surfaces of the side wall 80 and the wall surfaces of the internal surface forming members 86 control, or form, the shape of the molten mixture as it is discharged, in a vertically downward direction, from the lower face of the die 22.

Immediately upon the forced discharge from the extrusion die 22, the shaped material will be exposed to air which will cause an immediate temperature drop in at least the exterior surfaces of the material. Thus, the molten material, in the absence of any adverse forces to the contrary, will retain its initial formed shape, i.e., in this embodiment an elongated member 26 having a cross section consisting of internally disposed interconnected wall surfaces with cellular spaces between the wall surfaces, even though it is not completely solidified.

To promote solidification, the still somewhat compliant member 26 is immersed in water. In the continuous casting process described herein, the elongated member 26 is submerged in the water pit 24, which if needed as described above, a means for selectively controlling the water level within the pit 24. After reaching a desired length, the solidified elongated member 26 is severed from the continuous structure discharged from the extrusion die 22, and removed from the pit 24, whereupon the member 26 is self supporting, even when laid on it's side, and can be drilled, cut, machined or have other fabrication operations performed on it without adverse affect to the formed shape.

After removal from the water pit 24, the elongated member 26 is cut into a plurality of transverse sections by making a series of spaced, transverse cuts normal to the longitudinal length of the elongated member. This operation is not unlike slicing a loaf of bread to produce individual slices. For example, as shown in FIG. 5, each of the transverse sections 12 will have a network of interconnecting walls 98 defining a plurality of open cells 100 extending through the section 12.

The above described process is particularly suitable for forming the shipping pallet 12 shown in FIG. 5. The pallet may be advantageously formed of a mixture of thermoplastic polyethylene and scrap rubber, with the polyethylene comprising from 70% to 90% of the mixture. The overall length of the continuously extruded elongated member 26 is desirably about 7.6 m (25 feet) with transverse dimensions of about 91 cm (36 inches) by 102 cm (40 inches). The interconnecting side and interior walls each have a thickness of about 1.3 cm (½ inch), which, in that it is the minimum-clearance dimension within the forming die 22, it controls the particle size of non-melting reinforcing particles in the thermoplastic matrix. For that reason, it is preferable that the scrap rubber particles be no more than about 0.6 cm (¼ inch) is size.

The solidified elongated member 26 is cut into sections having a height of about 15 cm (6 inches). After making the transverse cut, reliefs 102 are cut across the vertical walls 98 on one side of the severed section to form notches to receive the forks of a lift truck. Thus, about 50 shipping pallets 12 measuring 91 cm (36 inches) by 102 cm (40 inches) by 15 cm (6 inches) high can be easily fabricated from a single extruded elongated member 26 from an elongated member 26 having a length of about 7.6 m (25 feet).

Other articles having an open cell structure may similarly be formed by the above described process. For example, decorative wall panels, fence sections, and open-grid ground support mats in which the openings may be filled with earth for driveways, sidewalks, and golf cart paths, are easily formable by cutting a continuously extruded elongated member into a plurality of transverse sections. In such articles, it may be desirable to have other than square, or rectangular, openings. The opening shape is easily altered by simply changing the cross-sectional shape of the interior surface forming members 86 in the die 22. Also, the extruded article could be formed around a solid structural member such as a pipe or rod that is fed through the die simultaneously with extrusion of material through the die. Other forming methods suitable for use with the heated mixer-conveyor 14 embodying the present invention include injection molding, die cast molding, and open mold casting.

Industrial Applicability

The method embodying the present invention for forming articles from recyclable plastic materials provides both economic and manufacturing advantages over currently available methods. The method, through the use of a heated mixer-conveyor 14, enables thermoplastic materials to be continuously progressively heated simultaneously with mixing and conveying, independently of an extruder. Thus, the material, when delivered to an extruder 18 is ready for injection into a mold or through a die 22. This enables the extruder 18 to deliver material to the mold or die 22 at a higher rate because heating and mixing of the material has already been performed. Thus, a smaller, less capital intensive, extruder can be used in carrying out the method embodying the present invention than has been required to achieve the same production rates heretofore.

Furthermore, the heated mixer conveyor 14 embodying the present invention alleviates much of the wear and damage imposed on an extruder through the presence of solid particles in a mixture of solid material in an extruder 18. The present invention, by providing a molten matrix for such particles prior to delivery to the extruder 18 significantly reduces the possibility of damage to the closely mated screw and wall surfaces of the extruder 18. This not only reduces maintenance and repair costs, but also reduces down-time attributable to maintenance and repair problems and prolongs the service life of an expensive machine.

Articles produced by the method and apparatus embodying the present invention are also less costly to manufacture because they provide for the continuous extrusion of members that can subsequently be easily fabricated. The method provides an economical way to reprocess environmentally undesirable scrap materials, such as plastic and rubber materials, into useful and beneficial articles. In particular, the present invention enables the economical formation, by continuous extrusion, of articles having an internal open-cell structure.

Other aspects, features and advantages of the present invention can be obtained from a study of this disclosure together with the appended claims.

What I claim is:

1. A method for forming an article from recyclable plastic material, comprising:

dividing a recyclable thermoplastic material having a predetermined melting temperature into a plurality of separate solid particles;

progressively heating said solid particles to about said predetermined melting temperature;

mixing said particles concurrently with said progressive heating and forming a substantially homogeneous molten mixture of said thermoplastic material;

continuously conveying said thermoplastic material during said progressive heating and said mixing from a first position at which said solid particles of the thermoplastic material are received in a substantially continuous flow, to a second position at which said material is discharged as a substantially continuous stream of said molten mixture;

subsequently shaping said molten mixture;

cooling said shape molten mixture; and, forming controllably a solidified article having a preselected shape.

2. A method for forming an article, as set forth in claim 1, including pressurizing the molten mixture prior to shaping, and said shaping includes directing the pressurized molten mixture into a die.

3. A method for forming an article, as set forth in claim 2, wherein said step of pressurizing the molten mixture is carried out in an extruder, and the step of shaping the pressurized molten mixture is carried out by extruding the pressurized molten mixture through a die in fluid communication with said extruder.

4. A method for forming an article, as set forth in claim 3, wherein said shaped mixture is discharged from said die in a substantially vertical direction, and the step of cooling the shaped mixture includes submerging at least a substantial portion of said shaped mixture in water.

5. A method for forming an article, as set forth in claim 1, including the step of mixing a plurality of reinforcing particles with said solid particles prior to progressively heating said solid particles, and the step of conveying said thermoplastic material includes conveying an intermixture of the reinforcing particles and the thermoplastic material.

6. A method for forming an article, as set forth in claim 5, wherein said reinforcing particles have a rubber composition.

7. A method for forming an article, as set forth in claim 5, wherein said reinforcing particles have a thermoset plastic composition.

8. A method for forming an article, as set forth in claim 5, wherein said reinforcing particles are fibers having a melting temperature greater than the melting temperature of said thermoplastic material.

9. A method for forming an article having a multiple open cell structure in which a network of interconnecting walls define a plurality of openings through said article, comprising:

delivering a flow of molten plastic material to an extruder;

pressurizing said molten plastic material;

forcing said material, under pressure, through an extrusion die, said die being shaped to form an elongated continuous member having a cross section consisting of internally disposed interconnected wall surfaces defining elongated cavities within said continuous member, and said die being positioned such that said elongated continuous member is discharged from said die in a vertically downward direction;

immersing said elongated continuous member in water;

cooling said elongated continuous member in said water to a temperature sufficient for the member to be self-supporting when placed in a horizontal position;

removing said elongated continuous member from the water; and, cutting said elongated continuous member into a plurality of transverse sections each of which form an article having a multiple open cell structure in which the interconnected wall surfaces defining the elongated cavities within the continuous member define a plurality of openings through the multiple open cell structure of the article.

10. A method for forming an article having a multiple open cell structure, as set forth in claim 9, wherein said molten plastic material comprises a mixture of plastic and reinforcing materials.

11. A method for forming an article having a multiple open cell structure, as set forth in claim 10, wherein said plastic material is a recyclable thermoplastic material, and said reinforcing material comprises rubber particles.

12. A method for forming an article having a multiple open cell structure, as set forth in claim 10, wherein said article is a shipping pallet having an open grid network of interconnecting vertical walls, said method comprising forming a plurality of reliefs in said vertical walls for accommodating at least one lifting device therein subsequent to cutting the elongated continuous member into a plurality of transverse sections.

13. A method for forming an article having a multiple open cell structure, as set forth in claim 12, wherein said molten plastic material comprises a mixture of plastic and reinforcing materials.

14. An apparatus for simultaneously heating, mixing, melting and conveying recyclable thermoplastic materials, comprising:

an elongated shell having a first end, a second end, and a cylindrical interior wall surface concentrically disposed about a longitudinal axis and extending between said first and second ends;

a rotor rotatably mounted in said shell in coaxial alignment with said longitudinal axis and having a predefined length, an exterior cylindrical wall surface spaced radially inwardly from the interior wall surface of said shell and extending along said length and cooperating with said exterior wall surface to form an annular cavity therebetween, and a plurality of elongated members each extending radially outwardly from said exterior wall surface of said rotor to a position proximate the interior wall surface of said shell, said elongated members being arranged in radially and axially spaced relationship in a spiral pattern around and along said longitudinal axis;

an inlet port forming an opening through said shell at a position adjacent the first end of said shell;

a discharge port forming an opening proximate the second end of said shell;

a means for heating the interior wall surface of said shell; and, a means for rotating said rotor.

15. An apparatus, as set forth in claim 14, wherein said plurality of elongated members are discrete cylindrical pegs extending along from about 67% to about 90% of the axial length of said rotor.

16. An apparatus, as set forth in claim 15, wherein said cylindrical pegs are radially and axially spaced from each other at a distance and in a pattern sufficient to permit material disposed in said annular cavity to be concurrently intermixed and conveyed from said inlet port to said discharge port.

17. An apparatus, as set forth in claim 16, wherein said cylindrical pegs have a diameter of about 1.9 cm (¾ inch) and are radially spaced from each other at about 30° intervals around said longitudinal axis and axially spaced from each other at about 2.5 cm (1.0 inch) intervals along said longitudinal axis.

18. An apparatus, as set forth in claim 14, wherein said means for heating the interior wall surface of said shell includes a jacket member substantially surrounding said shell and defining an annular cavity between said shell and said jacket, at least one fluid inlet port and one fluid outlet port in fluid communication with said annular cavity, and means for directing a controlled flow of heated fluid to said inlet port, through said annular cavity, and from said outlet port.

19. An apparatus, as set forth in claim 14, wherein said rotor has an end portion disposed proximate the inlet port of said apparatus, said end portion having continuous screw conveyor flighting disposed thereon and extending along from about 10% to about 33% of the length of said rotor.

20. A die for continuously forming an elongated member having a cross sectional structure consisting essentially of a plurality of internally disposed interconnected wall surfaces defining elongated cavities within said member, comprising:

a top wall;

a plurality of side walls cooperating with said top wall to define an open-ended cavity and having an opening through at least one of said side walls communicating with a pressurized source of fluid material; and, a plurality of internal surface forming members, said members being disposed within said open-ended cavity in spaced relationship with said side walls and with each other and having one end attached to said top wall of the die and at least one material shaping surface adjacent the open end of said cavity.

21. A die, as set forth in claim 20, wherein said internal surface forming members have a generally rectangular cross-sectional shape and said material shaping surface is a plurality of planar surfaces.

22. A die, as set forth in claim 20, wherein said internal surface forming members have a generally circular cross-sectional shape and said material shaping surface is a curved surface.

23. A die, as set forth in claim 20, wherein said internal surface forming members each have a vent passageway extending through said member, said vent passageway communicating between the open end of said cavity and an opening through the top wall of said die.

\* \* \* \* \*